May 11, 1926.
V. G. APPLE
DYNAMO ELECTRIC MACHINE
Filed March 20, 1920
1,584,502
3 Sheets-Sheet 1
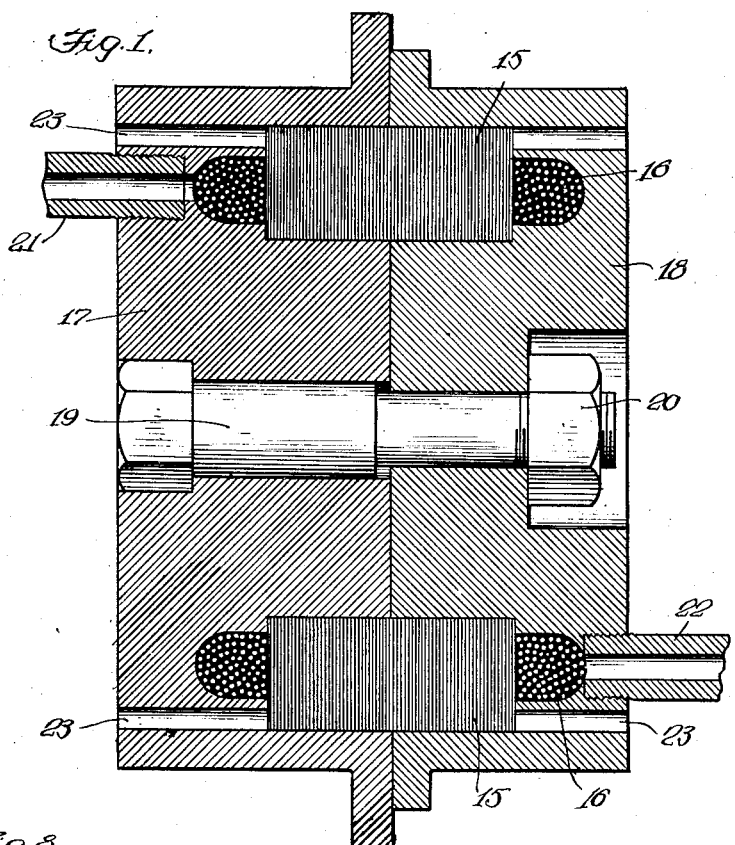
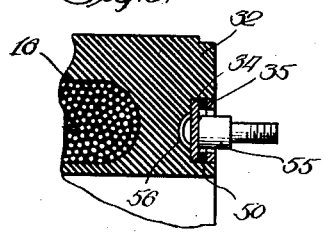
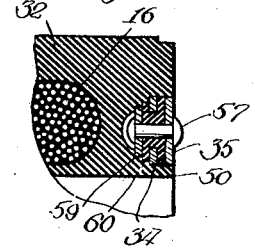
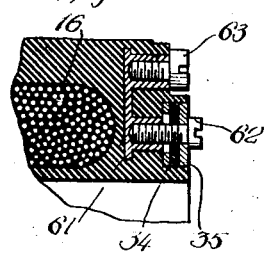
Inventor:
Vincent G. Apple.

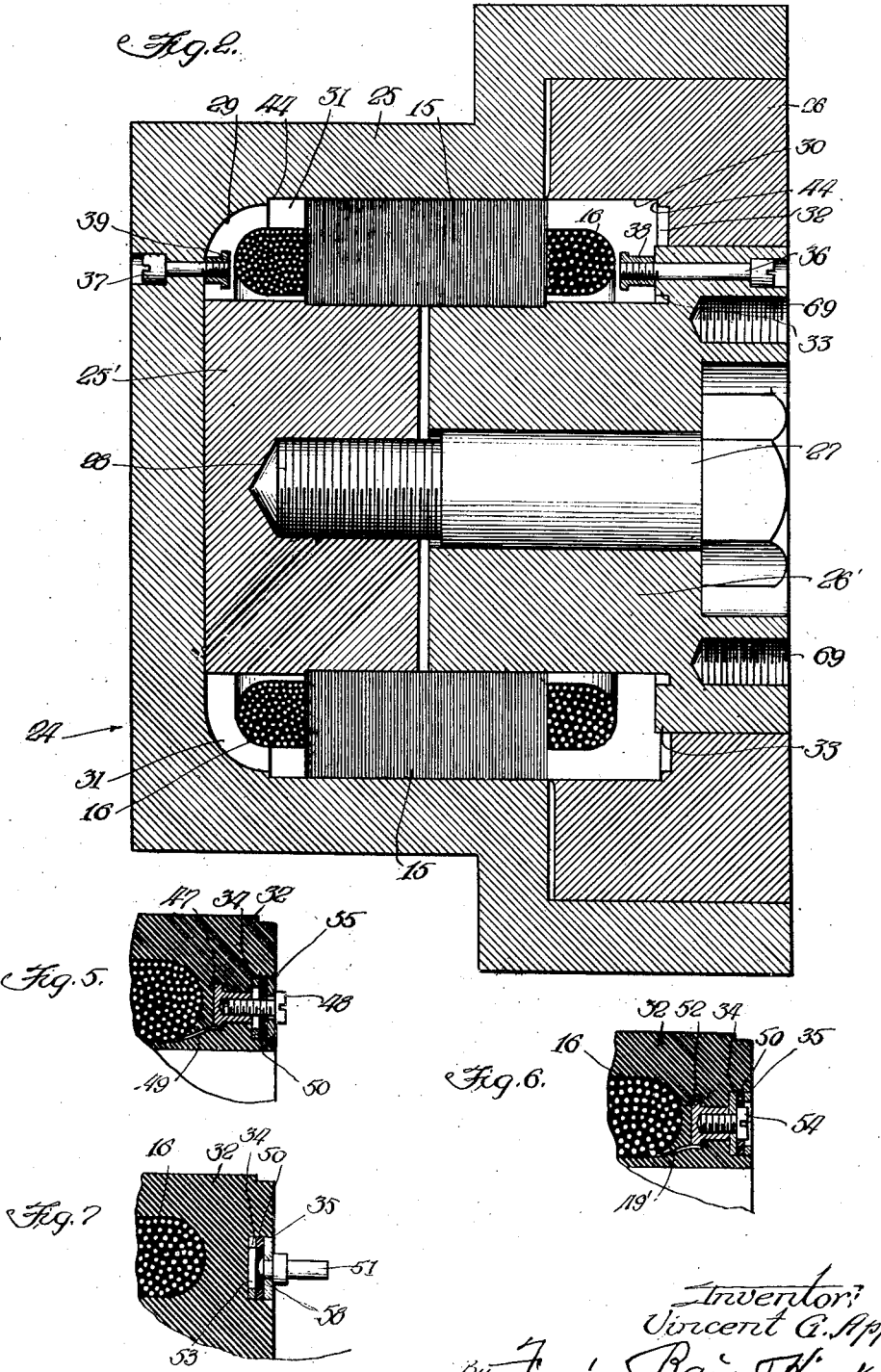

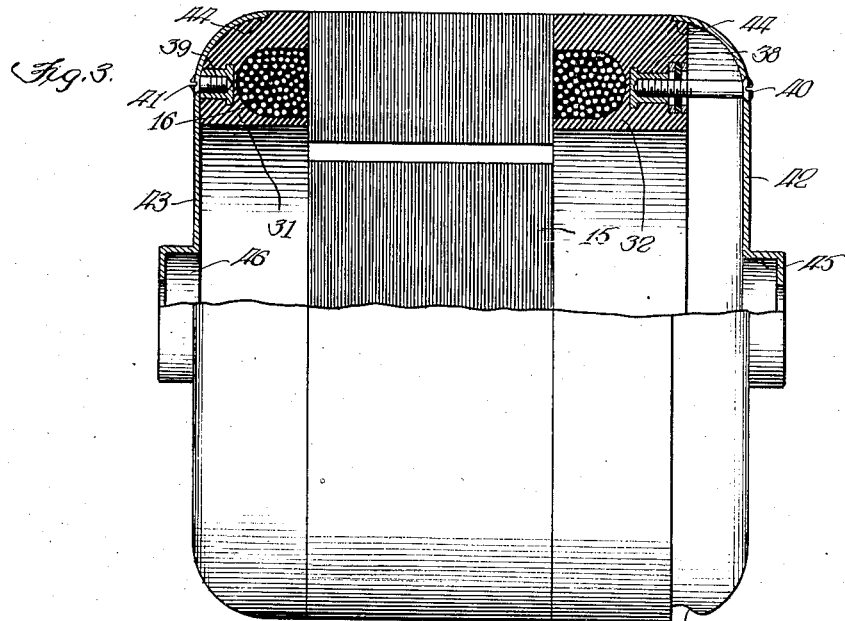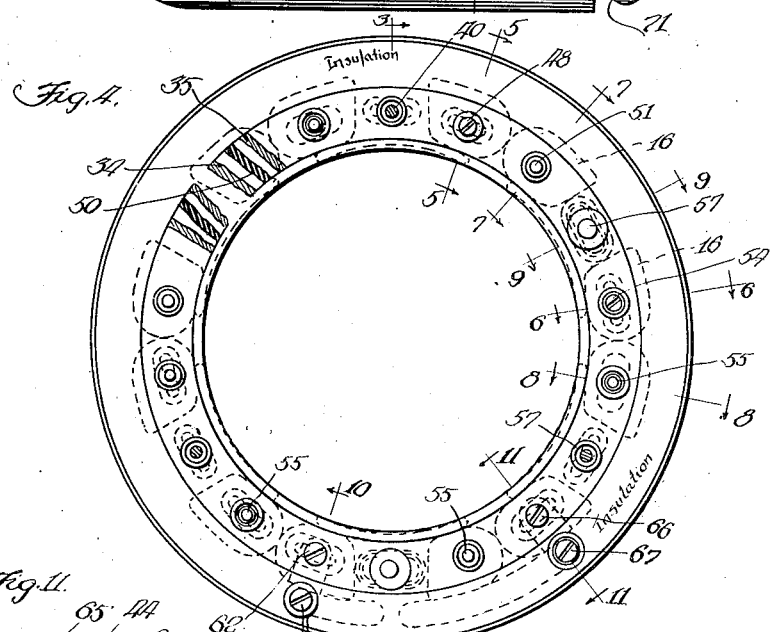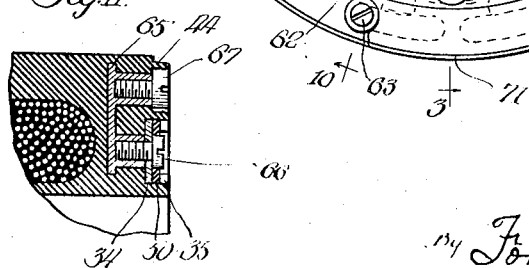

Patented May 11, 1926.

1,584,502

UNITED STATES PATENT OFFICE.

VINCENT G. APPLE, OF DAYTON, OHIO.

DYNAMO-ELECTRIC MACHINE.

Application filed March 20, 1920. Serial No. 367,363.

The invention relates to improvements in dynamo electric machines.

One of the objects of the invention is to enclose the windings of a field or stator, of a dynamo electric machine, in an insulating armor.

Another object of the invention is to enclose the windings of a field or stator, of a dynamo electric machine, in an insulating armor and to cement the windings to the core or frame and adjacent contacting objects by the application of the armor.

Another object is to mold the armor in such shape that it may be employed to support parts of the machine, such for example, as the end plates, brush holding parts and the like.

Another object is to mold in the insulating armor, inserts of suitable character, whereby to provide holding receptacles to receive screws, bolts or the like.

Another object is to thicken the armor in certain regions, so that it may extend from the metal frame to a sufficient degree to serve as supporting means for other spaced-away parts of the frame.

Another object is to provide a method of procedure in which a cementitious armor serves as a medium by which all of the parts of the field or stator are cemented and held together.

Another object is the provision of a method of primarily shaping and hardening the coil windings so that they will thereafter be in condition to withstand the effect of pressure to which they will be subsequently subjected by the application of the surrounding armor.

Other, further and more specific objects of the invention will become readily apparent to persons skilled in the art from a consideration of the following description when taken in conjunction with the drawings, wherein:—

Fig. 1 is a central section of the dynamo frame, windings and containing mold, ready for the initial application of the insulating material, or plastic to the coils.

Fig. 2 is a similar view, showing the dynamo frame and windings in a mold ready for application of the insulating armor, and showing the manner of placing the inserts to be incorporated in the armor.

Fig. 3 shows the dynamo frame after the insulating armor has been applied and shows the manner of attaching the metal end plates, in a section taken on line 3—3 of Fig. 4.

Fig. 4 is an end view of the field frame showing inserts and brush holding rings, secured in and supported by the annular ring of armor.

Fig. 5 is a fragmentary section taken on line 5—5 of Fig. 4, showing the manner of clamping the outer brush supporting ring to the armor and electrically connecting it to the field coils.

Fig. 6 is a similar view, taken on line 6—6 of Fig. 4, showing the manner of clamping the inner brush supporting ring to hold it in place and the manner of connecting it to the field coils.

Fig. 7 is a similar view, taken on line 7—7 of Fig. 4, showing a brush holding stud secured to the outer ring.

Fig. 8 is a similar view, taken on line 8—8 of Fig. 4, showing a brush holding stud connected to the inner ring.

Fig. 9 is a similar view taken on line 9—9 of Fig. 4 and shows the manner of assembling and holding the rings together before they are placed in the circumferential groove made in the end of the armor, at the time the latter is molded in place.

Fig. 10 is a similar view taken on line 10—10 of Fig. 4, showing an insert for a field terminal and one manner of connecting it to one of the brush supporting rings.

Fig. 11 is a similar view taken on line 11—11 of Fig. 4, showing the manner of connecting the other field terminal to the outer brush supporting ring.

In all the views the same reference characters are employed to indicate similar parts.

Heretofore it has been customary to dip dynamo electric elements in a phenolic condensation compound while in liquid form and subsequently permit the liquid to dry. This is a very wasteful means of insulating the armature because a great deal of the liquid, before it becomes sufficiently set to adhere to the armature or other elements of the dynamo, will drip out and be wasted and, besides, all of the openings or voids are not entirely filled. By placing the armature in a mold and injecting the liquid material into the armature under pressure every portion of the material is usefully utilized and all openings completely filled and an impervious cementitious protection or coating is provided for the conductor.

In the drawings 15 is the laminated core of a field frame or of a stator, as the case may be. In the instant case, it is shown as a field magnet. The laminated parts composing the core may first be coated with a phenolic condensation product, or the like, and then put together in registering positions and held under pressure to cement the lamina together. After this is done, the field coils, or windings 16, consisting of properly insulated wire, or preferably wire wound with a single coating of cotton fiber or thread are then put in place. When the core and windings are in this condition, the structure is then placed in a mold, shown in Fig. 1, consisting of the part 17 and a separable part 18, held together by bolt 19 and nut 20. A pipe 21 is inserted in the mold part 17 thru which a liquid phenolic condensation product, or the like, constituting the insulation to primarily impregnate the coils 16, is passed, under pressure. A similar pipe 22 may also be inserted in the part 18 of the mold, if necessary, and used for the same purpose.

The insulating medium is pumped into the mold, shown in Fig. 1, until all of the coils surrounding the field magnets are thoroughly impregnated with the insulation and the spaces between the wires entirely filled. The mold and its contents are then heated to a proper temperature to cause the reaction of the insulating compound, to harden it. This may be done while the material is under pressure or the pressure may be withdrawn and the openings thru which the liquid was inserted properly closed. The gas evolved by heating the liquid will produce sufficient pressure. The temperature to which the contents of the mold is subjected, is not sufficient to injure the primarily applied insulation on the wires, constituting the field coils. After the article has been subjected to the proper temperature, for a sufficient period of time, it is permitted to cool and the nut 20 is taken from the bolt 19 and the mold parts separated. Knockout holes 23 are provided in the mold for the purpose of ejecting the field or stator structure, so treated, from the mold. When the structure comes from the mold parts 17 and 18, the coils have been hardened and are homogeneous with respect to the insulating material that has been injected into them and are quite capable of withstanding a relatively higher pressure necessary for the application of the second coating of insulation, or the armor surrounding the coils. The structure is now placed in the mold 24, consisting of the parts 25 and 25', and the separable parts 26 and 26'. The bolt 27 passes thru the part 26' and is inserted into the part 25', as at 28. The mold 24 is preferably made of four separable parts 25 and 25' and 26 and 26'. Before the structure, as heretofore treated, is placed in the mold 24, a sufficient amount of molding phenolic condensation product or the like, in proper form, preferably in a dry comminuted condition, is placed in an annular space 29, between the parts 25 and 25' of the mold. Then the structure is placed in the mold parts 25 and 25'. Then the central part of the mold 26' is put in position and the bolt 27 is inserted and screwed firmly into place. Now the molding compound in comminuted or granular form is placed in the space 30 in sufficient quantity to entirely fill the space when pressure is applied to the plunger ring 26. The ring 26 is in the shape of a piston or plunger and when the mold as a whole, is placed in a hydralic press and pressure is applied to the ring 26, it will force the molding compound in the annular spaces 29 and 30 into intimate contact with the core 15 and the windings 16 of the field magnet, thus producing the insulating armor rings 31 and 32, on the opposite ends of the field magnet. The mold and its contents, are heated to the proper temperature and maintained heated for a sufficient time to cause the chemical reaction or hardening process of the insulation, to subsequently constitute the armor for the field.

An annular indentation or groove, in the disclosed embodiment, is provided in the armor, preferably in the front end, by the annular rib 33 that projects into the space 30 to provide a receptacle for containing the brush-carrying rings 34 and 35, and the necessary insulation therebetween.

In Fig. 2, I have shown screws 36 and 37 that pass thru the parts 25 and 26', respectively, for holding inserts 38 and 39, to be incorporated with the insulating armor 32 and 31, respectively. These inserts are receptacles for screws 40 and 41 of which there may be any desired number, for holding the end, or bearing plates 42 and 43 in place on the ends of the field magnet. A rabbet 44 may be molded in the ends of the armor to receive the salient inturned edges of the plates 42 and 43, as clearly shown in Fig. 3.

The end plates 42 and 43 contain hollow hubs 45 and 46 within which ball bearing structures may be inserted and held to provide bearings for the shaft of an armature to be subsequently inserted in the field structure.

Screws, similar to those indicated by the reference characters 36 and 37, may be passed thru the proper portions of the mold for the purpose of temporarily holding other inserts in place such inserts as are clearly shown in the respective figures from 5 to 11, inclusive.

In Fig. 5, insert 47 holds the screw 48 that passes thru the brush supporting rings 34 and 35 and presses the rings firmly into contact with the insulating armor 32. The insert 47 is connected to the coil 16 by the wire 49, thus connecting the ring 35 thru the insert and screw with one end of the field magnet windings. The ring 34 being insulated therefrom by the clearance space and by insulating ring 50.

In the instant structure, the field magnet is provided with six inwardly extending poles and therefore to each of the rings, 34 and 35, must be secured means for supporting the brush holders that are intended to accommodate six brushes that bear upon the commutator of the armature, that is to be associated with the field magnet.

Fig. 7 shows a stud 51 projecting from the ring 35, riveted thereto, as at 52, and it also shows the ring 34 cut away sufficiently, as at 53, to provide space for insulation from the stud 51. Connected thus to the ring 34 are three uniformly spaced-apart studs 51.

Fig. 6 shows the ring 34 for brushes of opposite polarity, connected to an insert 52, similar in character to the insert 47, and this insert is connected by a wire 49′ to the field coil 16, the other terminal of the series of such coils, thus placing the armature and the field windings in parallel relation. It will be observed that the screw 54 bears upon the ring 34 and has no contact with the ring 35, whereas the screw 48 has contact with the ring 35 and has not contact with the ring 34. Thus the rings 34 and 35 are maintained electrically separated. In Fig. 8 a stud 55 is shown riveted to the ring 34 and passing freely thru the ring 35. A part of the armor 32 is cut away, as at 56, to permit some circumferential movement of the stud 55 when the ring 34 is moved for the purposes of adjusting the position of the brushes for the proper position on the commutator. The two rings, 34 and 35, are, preferably, riveted together, by several rivets 57, before they are placed in the grooves made in the armor. See Fig. 9. The rivet 57, however, is not so tight that the rings 34 and 35 may not have some relative circumferential movement with respect to each other. The inner end of the rivet is surrounded by a steel washer 59 which bears upon an insulating washer 60 so that the rings, 34 and 35, are maintained electrically separated from each other, and may be moved together circumferentially in the groove in which they are situated, or may be moved separately, and clamped in their new situations by means of screws 48 and 54.

In Fig. 10, the insert 61 maintains two threaded openings for screws 62 and 63, the latter to serve as one of the terminals for the field windings and brushes. The screw 62 passes thru ring 34 and is in contact with the outer ring 35, thereby connecting the terminal screw 63 with the outer ring 35 while the inner ring 34 is insulated therefrom by the clearance space surrounding the screw and the hub portion of the insert 61.

A similar insert 65, shown in Fig. 11, one threaded opening for the screw 66, that connects the inner ring 34 with the insert, and the insert connects the latter with the terminal screw 67, which is one of the terminals of the winding of the field magnet, and the armature.

From the foregoing description, it will be apparent that the brush holding mechanism and the end plates for the field frame are supported entirely by the armor rings 31 and 32 that surround the coils 16 that are incorporated therein.

When the field magnet comes out of the mold 26, it is entirely self supporting, independently of the end plate upon which it is to be subsequently mounted for permitting the rotation of the shaft upon which the armature is to be carried, and all of the parts that are necessary, in the composition of the field magnet, are supported by the insulating armor that surround the field coils, which is cemented to the laminated structure, and each of the laminæ are firmly joined together by the hardening effect of the cementitious varnish with which they were previously coated.

In the mold structure there may be placed a sufficient number of threaded holes 69 within which to insert bolts to pull the parts of the mold asunder.

The bottom edge of the end plate 42 may be cut away, as at 71, to provide a perforation within which to insert the wires to be connected to the binding screws 63 and 67, which serve as terminals for the field coils of the structure and for the armature.

While I have shown a practical method by which the coils may be primarily hardened before the armor is applied to the hardened surfaces of the coils, my invention is not to be limited to the specific manner described, as other means or apparatus, differing in general configuration and arrangement may be employed for producing the same results within the scope of the appended claims.

While I have herein referred to a method and means for producing field magnet structures, for direct current dynamo electric machines, it will be understood, of course, that the same method and means may be employed for constructing stators or other like similar devices for alternating current dynamos.

Having described my invention what I claim as new and desire to secure by Letters Patent is:—

1. The method of producing an element of a dynamo electric machine which consists in coating the laminæ thereof with a heat hardening insulating cement and temporarily securing them together by application of pressure; applying the windings thereto, impregnating them with a similar cement, and then hardening the cement by application of heat.

2. The method of producing an element of a dynamo electric machine which consists in coating the laminæ thereof with a heat hardening insulating cement and temporarily securing them together by application of pressure; applying the windings thereto; impregnating them with a similar cement, and then hardening the cement by application of heat while the structure is confined in the mold.

3. The method of producing an element of a dynamo electric machine which consists in coating the laminæ thereof with a heat hardening insulating cement and temporarily securing them together by application of pressure; applying the windings thereto, impregnating them with a similar cement, and then hardening the cement by application of heat while the structure is confined in a mold and the contents subjected to pressure.

4. The method of producing an element of a dynamo electric machine which consists in coating the laminæ thereof with a heat hardening insulating cement and temporarily securing them together by application of pressure; applying the windings thereto, impregnating them with a similar cement, and then hardening the cement by application of heat and pressure while the structure is confined in a mold to cement the core and the windings together.

5. The method of producing an element of a dynamo electric machine which consists in coating the laminæ thereof with a heat hardening insulating cement and temporarily securing them together by application of pressure; applying the windings thereto, impregnating them with a similar cement, then hardening the cement by application of heat and pressure, and subsequently molding an armor of similar insulating material about the windings.

6. The method of producing an element of a dynamo electric machine which consists in temporarily securing the laminæ thereof together; applying the windings thereto, impregnating them with a cement that hardens by application of heat, then applying heat and pressure while the structure is confined in a mold to harden the cement, and then subsequently molding an armor of similar material about the windings.

7. The method of producing an element of a dynamo electric machine which consists in temporarily securing the laminæ of the core together; applying the windings thereto; inserting the structure in a mold, impregnating the windings with a heat hardening insulating cement, and subsequently molding an armor of similar material about the windings and about inserts to be partially submerged in the armor.

8. A field magnet having a hollow core leaving an axial opening within which to insert an armature; windings on the core, radially beyond the opening and projecting axially beyond the core and an insulating impervious cementitious armor extending around the core in form of an unbroken ring and encasing the aforesaid windings, thereby enclosing them.

9. A field magnet having a hollow core leaving an axial opening within which to insert an armature; windings on the core, radially beyond the opening and projecting axially beyond the core and an insulating impervious cementitious armor extending around the core in form of an unbroken ring and encasing the aforesaid windings, thereby enclosing them, said cementitious material being thicker near the outer edge of the ring.

10. A field magnet having a hollow core leaving an axial opening within which to insert an armature; windings on the core, radially beyond the opening and projecting axially beyond the core and an insulating impervious cementitious armor extending around the core in form of an unbroken ring and encasing the aforesaid windings, thereby enclosing them, said cementitious material being thicker near the outer edge of the ring, and inserts embedded in the thicker portion of the insulating material to receive attaching means.

11. A field magnet having a substantially annular core provided with an axial opening within which to insert an armature; windings on the core radially beyond the opening and extending axially beyond the core; an insulating armor in form of a ring at each end of the core enclosing the windings.

12. A field magnet having a core, windings thereon, an insulating cementitious armor encasing the windings thereoef, substantially enclosing the windings, and cementing them to the core; inserts embedded in said armor and end plates for the field frame secured to the inserts.

13. A field magnet having a core, windings thereon, an insulating cementitious armor encasing the windings thereof, substantially enclosing the windings, and cementing them to the core; inserts embedded in said armor and brush holding means secured to the inserts.

14. A field magnet having a core, windings thereon, an insulating cementitious armor encasing the windings thereof, substantially enclosing the windings, and cementing them to the core; inserts embedded in the armor affording electric terminals for the windings.

15. A field magnet having a substantially annular core provided with an axial opening within which to insert an armature; windings on the core radially beyond the opening and extending axially beyond the core; an insulating armor in form of an unbroken ring at each end of the core enclosing the windings and extending outwardly substantially flush with the periphery of the core.

16. A field magnet having an insulating armor surrounding the ends of the coils and continuing in an unbroken ring around the structure, and having a rabbet near its outer surface to receive an inturned edge of an end plate.

17. A field magnet having an insulating armor surrounding the ends of the coils and continuing in an unbroken ring around the structure and having a rabbet near its outer surface to receive the inturned edges of an end plate; inserts molded in said armor; an end plate seated in said rabbet and screws passing thru the plate into the inserts to hold the plates in place.

18. A field magnet having an insulating armor surrounding the ends of the field coils and continuing in an unbroken ring around the structure and having a rabbet near its outer surface to receive the inturned edges of an end plate; inserts molded in said armor; an end plate seated in said rabbet and means associated with said inserts to hold the plates in place.

19. A field magnet having an insulating armor surrounding the ends of the field coils and continuing in an unbroken ring around the structure and having a rabbet near its outer surface to receive the inturned edges of the end plate; an end plate seated in said rabbet and means molded in said armor to hold the plates in place.

20. A field magnet having a core, windings thereon, an insulating armor encasing the windings thereof substantially enclosing the windings and continuing in an unbroken ring around the structure and having an armature shaft support secured to said armor.

21. A field magnet having an insulating armor surrounding both ends of the field coils; an end support for an armature shaft at each end of the structure secured to said armor and a bearing carried by each said support for the armature shaft.

22. A field magnet fo a dynamo electric machine having its windings impregnated with a phenolic insulation and an armor of the same material enclosing the coils and continuing in a ring about the structure.

23. A field magnet for a dynamo electric machine having a core, coils thereon, its coils impregnated with a phenolic insulation and an armor of substantially the same material enclosing the coils and continuing in a ring about the structure and cementing the coils and core together.

24. A field magnet for a dynamo electric machine having its coils impregnated with a phenolic insulation to fill all of the voids between the wires; and an armor of similar material surrounding the ends of the coils and located near its peripheral surface.

25. The method of insulating a dynamo element which consists in securing together the laminæ, of which the magnetic portion is composed, by phenolic condensation product; applying the conducting windings to the laminæ; placing the laminæ and windings in a mold; injecting mobile phenolic condensation product into the mold, by application of pressure and heating the mold and contents to harden the cementitious binder.

26. The method of insulating a dynamo element which consists in coating the laminæ, of which the magnetic portion is composed, with liquid phenolic condensation product; applying pressure to cause the laminæ to temporarily adhere together without requiring other supports; applying the conducting windings to the laminæ; placing the laminæ and windings in a mold; injecting liquid phenolic condensation product into the mold under pressure, and heating the mold while its contents are under pressure to cause the laminæ to adhere more firmly together and the subsequently injected adhesive to harden.

27. The method of insulating a dynamo element which consists in coating the laminæ, of which the magnetic portion is composed, with liquid phenolic condensation product; applying pressure to cause the laminæ to temporarily adhere together without requiring other support; applying the conducting winding to the laminæ; placing the laminæ and winding in a mold, leaving space between the windings and the mold for a coating to enclose the windings; injecting a liquid phenolic condensation product into the mold under pressure to impregnate the conducting portions and to form a coating thereabout, and heating the mold while its contents are under pressure to cause the laminæ to adhere more firmly together and the subsequently injected adhesive to harden.

28. The method of making dynamo electric machines which consists in assembling the laminæ of which the magnetic portions are composed; making a self-supporting structure of the laminæ by primarily coating the laminæ with phenolic condensation product; applying pressure to the laminæ to cause the structure to hold together before complete reaction of the adhesive has taken place; placing the winding on the laminated structure; placing the structure in a mold and closing the mold; subsequently injecting liquid phenolic condensation product into the mold by application of pressure; and maintaining the pressure during the reaction of the adhesive and heating the mold and contents to cause reaction.

In testimony whereof I hereunto subscribed my name.

VINCENT G. APPLE.